United States Patent [19]

Wright

[11] Patent Number: 4,924,740
[45] Date of Patent: May 15, 1990

[54] ADJUSTABLE MOUNTING FOR MULTIGOB APPARATUS FOR STRAIGHT LINE SHEARING

[75] Inventor: Douglas W. Wright, Tariffville, Conn.

[73] Assignee: Emhart Industries, Inc., Hartford, Conn.

[21] Appl. No.: 229,057

[22] Filed: Aug. 5, 1988

Related U.S. Application Data

[63] Continuation-in-part of Ser. No. 119,013, Nov. 10, 1987, abandoned.

[51] Int. Cl.$^5$ ............................................. C03B 5/38
[52] U.S. Cl. ............................... 83/527; 65/334; 83/623; 83/640; 83/700
[58] Field of Search ............ 83/527, 530, 620, 623, 83/640, 641, 700; 65/133, 303, 332, 334

[56] References Cited

U.S. PATENT DOCUMENTS

| | | | |
|---|---|---|---|
| 4,215,611 | 8/1980 | Dahms | 83/623 |
| 4,450,741 | 5/1984 | Mumford | 83/623 |
| 4,499,806 | 2/1985 | Mumford | 83/527 |

*Primary Examiner*—Hien H. Phan

[57] ABSTRACT

The improved apparatus for straight line shearing of multiple gobs from columns of molten glass includes a shear frame to which multiple shear blade assemblies and shear blade adjustment mechanisms are mounted to facilitate changeover between single, double, and multiple gob configurations. At least one shear frame wall includes a plurality of slots aligned along an axis of separation of the shear blade assemblies and shear blade adjustment mechanisms, the adjustment mechanisms each including an indexing rod and adjusting shaft which may be repositioned within one of said slots to adjust the separation of the shear blade adjustment mechanisms. Advantageously, in a shear mechanism designed to accommodate single, double, and triple gob configurations, two such slots are provided for the outermost indexing rods, such rods being located at their points of maximum separation for single or triple gob shearing, and their points of minimum separation for double gob shearing. In order to provide a more remote manual adjustment of the shear blade adjustment mechanisms, each indexing rod may be geared to a transverse rod which is journaled in an extension plate of the shear frame; in such embodiment, the extension plate includes slots corresponding to the slots in the shear frame wall in order to permit repositioning of the transverse shafts commensurate with that of the indexing rods.

2 Claims, 3 Drawing Sheets

ADJUSTABLE MOUNTING FOR MULTIGOB APPARATUS FOR STRAIGHT LINE SHEARING

This is a continuation-in-part of application Ser. No. 119,013 filed Nov. 10, 1987, now abandoned.

BACKGROUND OF THE INVENTION

The present invention relates generally to a shear mechanism for cutting successive portions from a column of molten glass, and more particularly to an improved mounting of a shear blade adjustment mechanism.

Commonly assigned U.S. Pat. No. 4,215,611 to Dahms discloses a commercially successful system for straight line shearing of molten glass, which severs gobs of molten glass between "upper" and "lower" horizontally reciprocating shear blades. This patent discloses at column 4, line 29–column 5, line 63, with reference to FIGS. 1, 3, and 5 of that patent, an intricate system for mounting one or more lower shear blade to a lower shear head which, in turn, is mounted to a carriage member. The lower shear head incorporates an indexing mechanism which permits the user to adjust the shear blade tension by turning a hand knob affixed to the end of an indexing rod which is journaled in a wall of the shear blade frame. This patent further discloses at column 8, line 56–column 9, line 7, the possibility of changing over between a single blade (single gob) to two or more blades in the shear mechanism. It is noted that to change to a different number of lower shear blades, the shear blade bracket is removed from the carriage by removing certain bolts, and a new bracket equipped with the desired number of shear blades, and each blade with its adjustment mechanism then attached to the carriage. It is further noted that the indexing rods must be removed or added and spaced as necessary.

In producing a commercial embodiment of the apparatus of U.S. Pat. No. 4,215,611, designed to accommodate triple gob shearing, the assignee of the present invention refined the shear blade adjustment mechanism described above by replacing the simple hand knob at the end of the indexing rod outside the shear frame with a miter gear which mated With a miter gear at the end of a transversely oriented shaft. This shaft was journaled in a plate of the shear frame, and the hand knob was placed at the other end of the shaft. By providing a more remote control arrangement, this permitted a more convenient adjustment of shear blade tension from below the shear, which in operation in a glass plant, is located at a height making such adjustment inconvenient.

A problem inherent in the '611 design, not overcome by the refinement described above, is the extraordinary inconvenience of changing the lower shear blade assembly between, for example, double gob and triple gob configurations. Such changeovers are often required, for example, on a seasonal basis, in accordance with seasonal demands for different types of glassware containers. In this changeover, as discussed above, it is necessary to relocate the outermost lower shear heads, and their tensioning adjustment mechanisms, inasmuch as in the single and triple gob configurations these are located further apart than in the double gob configuration. (In the double gob configuration of this commercial prior art system, as well as that of the present invention, the central lower shear blade head may be indexed to an out-of-the-way position which will not interfere with the shearing operation.) This necessitated removing the two outermost indexing rods from one aperture in the end plate and reinserting and attaching it in an adjacent aperture. Furthermore, the outermost lower shear blade heads had to be removed and reattached. The maintenance operator was unable to obtain adequate access for this operation while the shear mechanism was attached to the feeder bowl by a bracket which partially blocks access to the end plate. Such changeover operation therefore required taking down the shear mechanism, causing highly undesirable down time.

Accordingly, it is an object to the present invention to provide an improved straight line shearing apparatus of the type disclosed in U.S. Pat. No. 4,215,611, wherein a changeover of such apparatus between double gob and triple gob configurations (or like changeover) may be accomplished in a more convenient manner. A related object is to eliminate the need to remove the shear mechanism from its mounting to the feeder bowl in order to accomplish such a changeover.

BRIEF DESCRIPTION OF THE DRAWINGS

The above and additional aspects of the invention are illustrated in the detailed description of the preferred embodiment which follows, which is to be taken in conjunction with the drawings in which.

DETAILED DESCRIPTION

Figure 1:
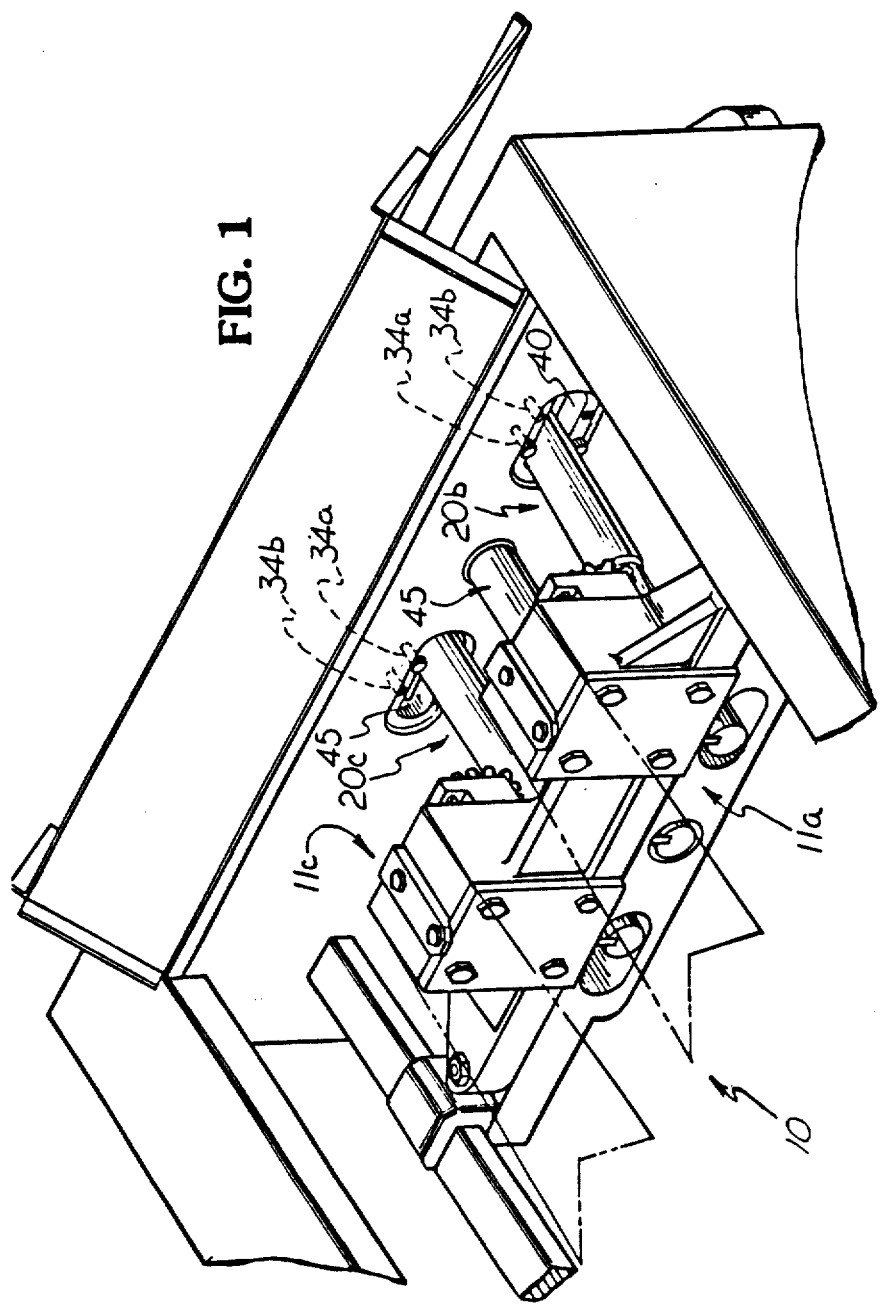
FIG. 1 is a perspective view of the shear frame wall and shear blade adjustment mechanisms of FIG. 3, as seen from the inside of the shear frame wall.
Figure 2:
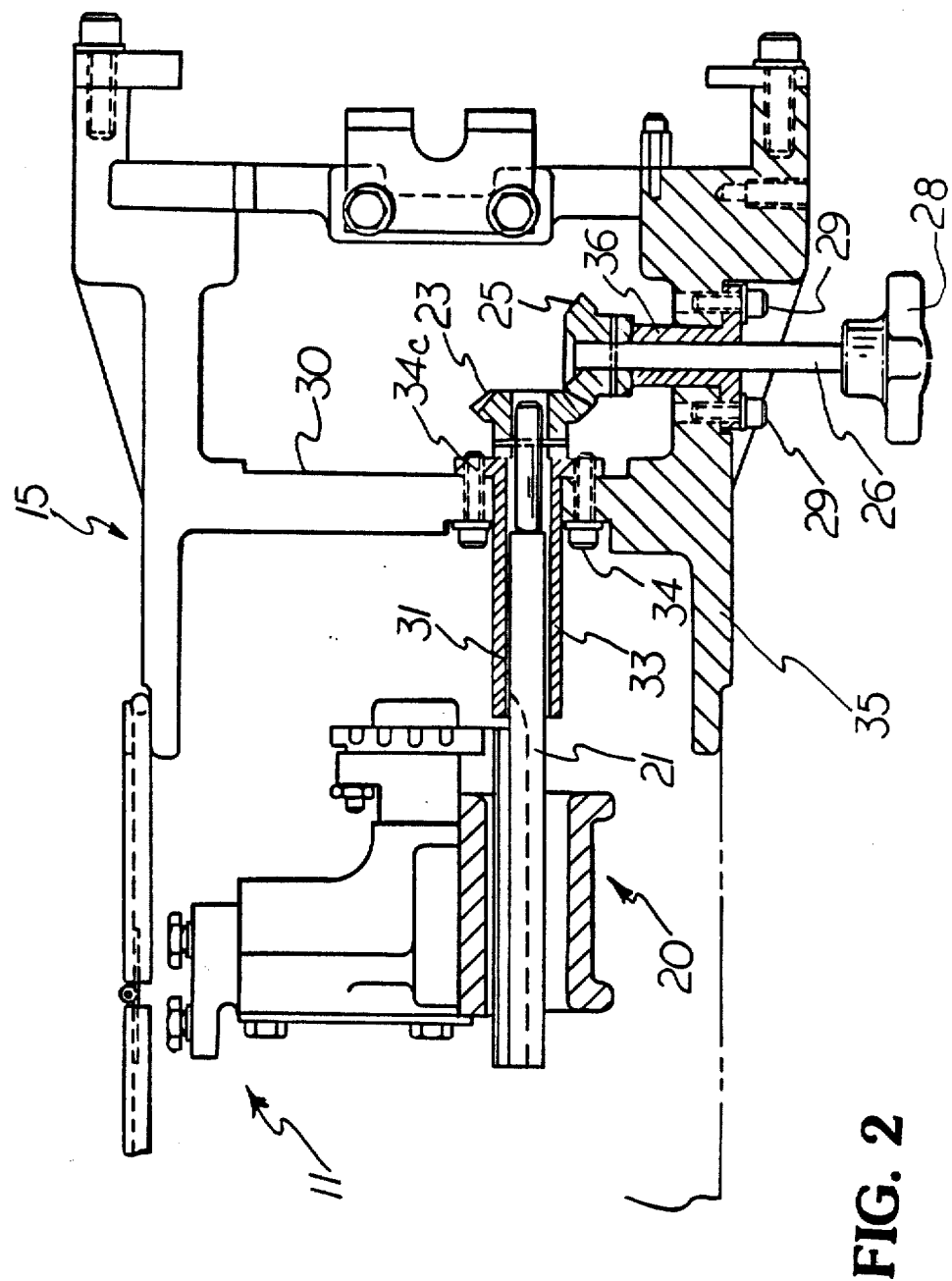
FIG. 2 is a sectional view of the shear mechanism of FIG. 3 taken along a central plane of an adjustably positioned lower shear blade assembly/tensioning mechanism.

The shear mechanism is designed to accommodate single, double, or triple gob shearing, and accommodates three lower shear blade assemblies 11 and accompanying shear blade tension adjustment mechanisms 20. With reference to FIGS. 1 and 2, each such adjustment mechanism 20 includes an indexing rod 21 projecting from the frame wall 30 and terminating in a miter gear 23. The miter gears 23a–23c at the ends of indexing rods 21a–21c-respective miter gears 25a–25c atop adjustment shafts 26 which are transversely oriented to indexing rods 21. Hand knobs 28 at the lower end of shafts 26 permit manual adjustment of the respective lower shear blade tension.

Each indexing rod 21 is journaled in a bearing 31 of a brass T-bushing 33 mounted in the frame wall 30 by a pair of hex screws 34 which can be inserted into either horizontally spaced vertical pair of locating holes 34a, 34b and received by suitable threaded holes 34c in the flange portion of the T-bushing 33. Similarly, each adjustment shaft 26 is mounted in a support T-bushing 36 affixed to the flange plate 35 of frame 15 by hex screws 29 which can be inserted through flange holes 29c into either horizontally spaced vertical pair of threaded locating holes 29a, 29b.

Figure 3:
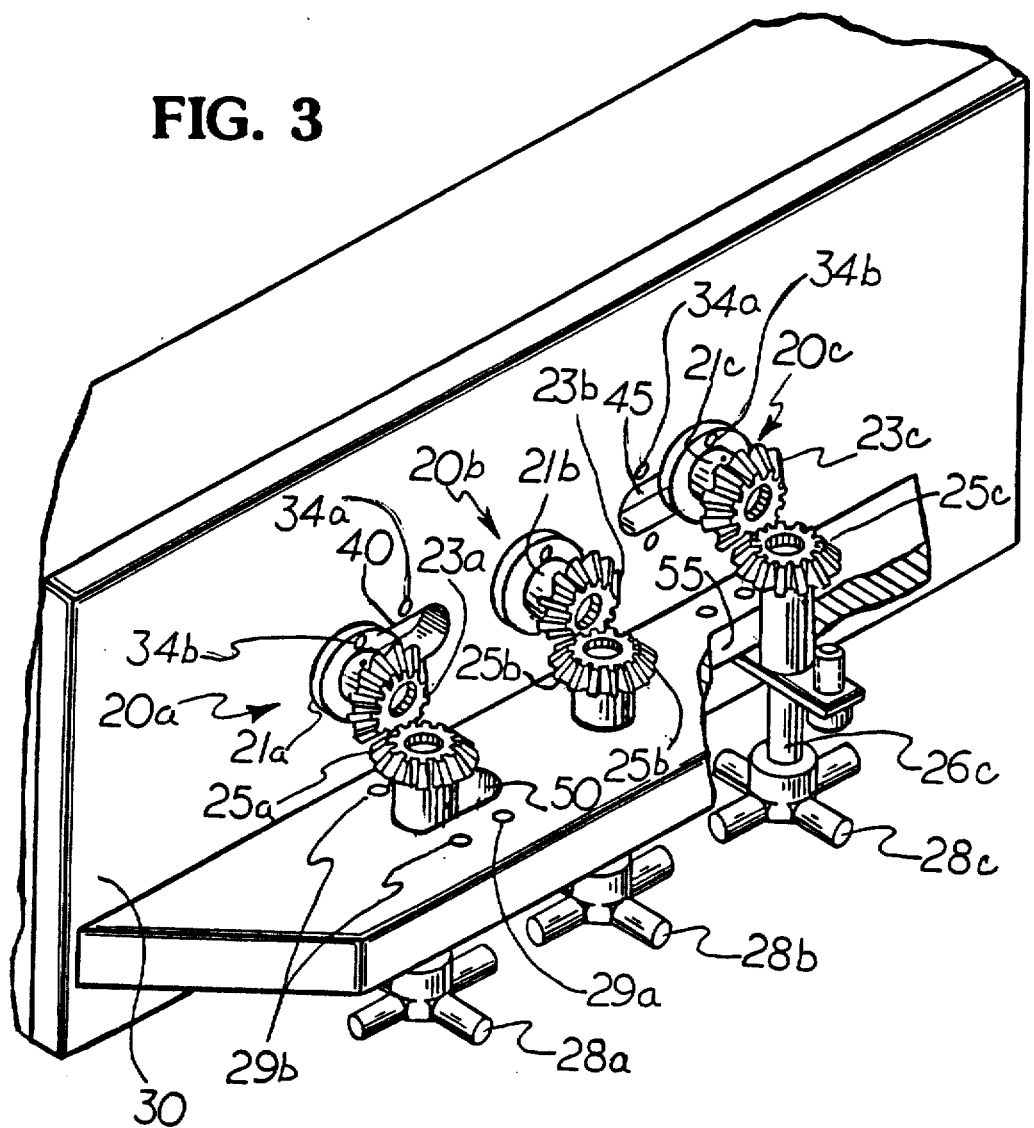
FIG. 3 is an outside perspective view of the shear frame of an adjustable triple gob shear mechanism in accordance with the invention.

Referring to FIGS. 1 and 3, it will be seen that the operator may relocate the outermost shear blade tension adjusting assemblies 20a and 20c between inner (low separation) and outer (high separation) locations defined by adjusting slots 40 and 45 in the shear frame wall and corresponding slots 50 and 55 in the flange plate. In the illustrated embodiment, the shear mechanism 10 may be reconfigured among any of its three configurations (single, double, and triple gob) by suitable substitution of shear blade assemblies and drop guide members in accordance with U.S. Pat. No. 4,215,611, and as to that aspect to which the present invention pertains, by repositioning the shear blade adjustment mechanisms within the shear frame slots 40 and 45 and flange plate slots 50 and 55. FIG. 3 illustrates the triple gob configuration wherein assemblies 20a and 20c are located at their outermost positions, while FIG. 2 illustrates the double gob (innermost) configurations. For example, for a changeover from double gob to triple gob, the hex screws 34 would be removed from the inner pair of locating holes 34 of the outer shear blade tension adjustment assemblies 20a and 20c would then be moved from the inner ends to the outer ends of slots 40 and 45 at which the assemblies would be resecured to the other vertical locating holes 34b of the inside 20a and outside 20c adjustment mechanism. A like procedure would be followed to move the shafts 26a and 26c from the inner to the outer ends of slots 50 and 55. As in the prior art, the central shear blade assembly 11b would be cranked from an out-of-the way position near frame wall 30 to an operative position for triple gob shearing. In contrast to the changeover procedures of the prior art, there would be no need for removing indexing rods or shear blade tension adjusting mechanisms in order to effect this adjustment.

I claim:

1. A shear mechanism for shearing discrete gobs of molten glass from a single or a pair of spaced or three equally spaced vertically descending runners of molten glass discharged from a spout bowl assembly or the like comprising central, second and third shear blade adjustment assemblies each including:
        an indexing rod having a miter gear at one end,
        an adjustment shaft having a miter gear at one end for operatively engaging with said indexing rod miter gear;
    frame means having a vertical wall portion and a horizontal wall portion adapted to support said central shear blade adjustment assembly (20b) at a central location thereof,
        a pair of horizontal slots defined in said vertical wall portion on either side of said central shear blade adjustment assembly for receiving the indexing rods of the second and third shear blade adjustment assemblies,
        a pair of vertical slots defined in said horizontal wall portion on either side of said central shear blade adjustment assembly (20b) for receiving the adjustment shafts of the second and third shear blade adjustment assemblies and
    first means for locating the indexing rod and adjustment shaft of said second assembly at either end of said associated vertical and horizontal slots and
    second means for locating the indexing rod and adjustment shaft of said third assembly at either end of said associated vertical and horizontal slots
    so that said second and third assemblies are adjustably located at the respective inner end of said slots for double gob operation and at the respective outer end of said slots for triple gob operation.

2. A shear mechanism according to claim 1 wherein said first and second locating means comprises two pairs of vertically spaced holes associated with each slot.

* * * * *